United States Patent
Osman et al.

(10) Patent No.: US 12,015,343 B2
(45) Date of Patent: Jun. 18, 2024

(54) APPARATUS, METHOD AND SYSTEM FOR PULSE PAIRING IN A MULTI-OUTPUT DC-DC CONVERTER

(71) Applicant: Silicon Laboratories Inc., Austin, TX (US)

(72) Inventors: Hatem Osman, Austin, TX (US); Michael D. Mulligan, Austin, TX (US); Mohamed Elkholy, College Station, TX (US)

(73) Assignee: Silicon Laboratories Inc., Austin, TX (US)

( * ) Notice: Subject to any disclaimer, the term of this patent is extended or adjusted under 35 U.S.C. 154(b) by 253 days.

(21) Appl. No.: 17/537,815

(22) Filed: Nov. 30, 2021

(65) Prior Publication Data

US 2023/0170799 A1 Jun. 1, 2023

(51) Int. Cl.
*H02M 3/157* (2006.01)
*H02M 1/00* (2006.01)

(52) U.S. Cl.
CPC ......... *H02M 3/157* (2013.01); *H02M 1/0041* (2021.05)

(58) Field of Classification Search
CPC .. H02M 1/0041; H02M 1/0043; H02M 1/008; H02M 1/009; H02M 3/157; H02M 3/158; H02M 3/156; H02M 3/155
See application file for complete search history.

(56) References Cited

U.S. PATENT DOCUMENTS

| 9,973,285 | B1 | 5/2018 | Khoury | |
|---|---|---|---|---|
| 10,128,857 | B1 | 11/2018 | Elkholy et al. | |
| 2009/0273498 | A1* | 11/2009 | Goder | H02M 3/1584 341/141 |
| 2010/0079088 | A1* | 4/2010 | Lipcsei | H05B 45/20 315/297 |
| 2018/0048230 | A1* | 2/2018 | Park | H02M 3/1584 |
| 2021/0336539 | A1 | 10/2021 | Elkholy et al. | |

* cited by examiner

*Primary Examiner* — Nguyen Tran
(74) *Attorney, Agent, or Firm* — Trop, Pruner & Hu, P.C.

(57) ABSTRACT

In one embodiment, a method includes: enabling a pulse pair circuit of an integrated circuit in response to determining that a receiver associated with the integrated circuit is active; identifying that at least one comparator of a multi-output DC-DC converter trips, the DC-DC converter having a plurality of comparators each to compare a regulated voltage output by the DC-DC converter to a corresponding reference voltage; and generating, in the pulse pair circuit, a control pulse pair according to the tripped output, and driving a driver circuit of the DC-DC converter using the control pulse pair.

20 Claims, 8 Drawing Sheets

APPARATUS, METHOD AND SYSTEM FOR PULSE PAIRING IN A MULTI-OUTPUT DC-DC CONVERTER

BACKGROUND

A DC-DC converter is a form of voltage converter that receives input of a DC voltage and modifies it to output a DC voltage of a different voltage level. Different topologies of converters enable boost and buck operations. DC-DC converters are desirable to use in powering portable devices such as wireless devices, since they can reduce the current drawn from a battery power supply. Many types of DC-DC converters exist, including pulse width modulation (PWM) converters and pulse frequency modulation (PFM) converters. Different converters may be preferable for certain applications. For example, a PFM converter maximizes efficiency over a wider range of load currents than does a PWM DC-DC converter.

However, one drawback of a PFM converter is that its switching operations can cause interference in radio frequency (RF) circuits that is difficult to control, since the interfering energy is spread over a wide and unpredictable frequency band. In either the buck or boost case, the switching activity generates high frequency noise, causing electromagnetic interference (EMI) that may interfere with operation of surrounding circuitry. A wireless receiver, for example, maximizes its input gain sensitivity in order to detect weak wireless signals. EMI generated by a DC-DC converter may interfere with receiver operation, possibly preventing the receiver from detecting weak signals.

SUMMARY OF THE INVENTION

In one aspect, an apparatus comprises: a driver circuit having a first control input, a second control input and an output node coupled between a supply voltage node and a reference voltage node, the driver circuit to receive control pulses and output a plurality of current pulses in response to the control pulses, the driver circuit to provide a plurality of regulated voltages according to the control pulses; a selection circuit coupled to the output node, wherein the selection circuit is to be controlled to output one or more of the plurality of current pulses to a selected one of a plurality of load nodes, each of the plurality of load nodes to provide at least one of the plurality of regulated voltages; and an arbiter coupled to the selection circuit, wherein in a pulse pair mode, the arbiter is to control the selection circuit to direct a sequential pair of the plurality of current pulses to one of the plurality of load nodes.

In an example, the arbiter is to control the selection circuit based on a comparison of a regulated voltage at the selected load node to a reference voltage. The apparatus may further comprise a plurality of comparators, each of the plurality of comparators to compare a regulated voltage at one of the plurality of load nodes to one of a plurality of reference voltages. The arbiter may select the one of the plurality of load nodes to receive the sequential pair of the plurality of current pulses when the regulated voltage at the selected load node is less than the reference voltage. After the selection circuit directs the sequential pair of the plurality of current pulses, the arbiter is to control the selection circuit to direct another sequential pair of the plurality of current pulses to a different one of the plurality of load nodes.

In an example, the apparatus further comprises a microcontroller to enable the pulse pair mode when a receiver is active and disable the pulse pair mode when the receiver is inactive. The selection circuit may send a first sequential pulse pair to a first load node of the plurality of load nodes and thereafter send a plurality of sequential pulse pairs to a second load node of the plurality of load nodes. The apparatus may further comprise a calibration circuit to control an on-time duration of the control pulses, where when a secondary regulated voltage is selected, the calibration circuit is to be disabled. The arbiter may operate in a freeze mode to control the selection circuit to direct the sequential pair of the plurality of current pulses to the one of the plurality of load nodes. The arbiter may maintain a count of the sequential pair of the plurality of current pulses, and after the selection circuit directs a second one of the sequential pair of the plurality of current pulses to the one of the plurality of load nodes, the arbiter is to exit the freeze mode.

In another aspect, a method comprises: enabling a pulse pair circuit of an integrated circuit in response to determining that a receiver associated with the integrated circuit is active; identifying that at least one comparator of a DC-DC converter trips, the DC-DC converter having a plurality of comparators each to compare a regulated voltage output by the DC-DC converter to a corresponding reference voltage; and generating, in the pulse pair circuit, a control pulse pair according to the tripped output, and driving a driver circuit of the DC-DC converter using the control pulse pair.

In an example, the method further comprises directing a pair of current pulses output by the driver circuit in response to the control pulse pair to a first load node of a plurality of load nodes, the first load node coupled to the tripped comparator, the first load node to provide a first regulated voltage. The method may further comprise, after directing the pair of current pulses to the first load node, directing another pair of current pulses to another load node, the another load node coupled to another tripped comparator, the another load node to provide another regulated voltage. The method may further comprise enabling a calibration circuit to control an on time duration for the control pulse pair. The method may further comprise when a secondary regulated voltage is below a threshold level, disabling the calibration circuit. The method may further comprise directing the pair of current pulses to the first load node when the first regulated voltage is at a variance with respect to a reference level. The method may further comprise disabling the pulse pair circuit in response to receiver inactivity, and thereafter directing single current pulses to a selected one or more of the plurality of load nodes.

In another aspect, a system includes a radio frequency (RF) receiver to receive a RF signal and process the RF signal into a lower frequency signal; a DC-DC converter to receive a supply voltage at a supply voltage node and generate a plurality of regulated voltages to be provided via a plurality of output nodes; and at least one digital circuit coupled to the RF receiver to process the lower frequency signal, the DC-DC converter to provide a first regulated voltage to the RF receiver and provide a second regulated voltage to the at least one digital circuit.

In an example, the DC-DC converter comprises: a driver circuit having a first control input, a second control input and an intermediate node coupled between a supply voltage node and a reference voltage node, the driver circuit to receive control pulses and output a plurality of current pulses in response to the control pulses; a selection circuit coupled to the intermediate node, wherein the selection circuit is to be controlled to output one or more of the plurality of current pulses to a selected one of the plurality of output nodes; and an arbiter coupled to the selection circuit, wherein when the RF receiver is active, the arbiter is to control the selection circuit to direct a sequential pair of the plurality of current pulses to the selected one of the plurality of output nodes.

In an example, the system further comprises a plurality of comparators, each of the plurality of comparators to compare a regulated voltage at one of the plurality of output nodes to one of a plurality of reference voltages, where the arbiter is to select the one of the plurality of output nodes to receive the sequential pair of the plurality of current pulses when the regulated voltage at the selected output node is less than the reference voltage. The arbiter may maintain a count of the sequential pair of the plurality of current pulses to the selected one of the plurality of output nodes, and enable direction of another sequential pair of the plurality of current pulses to a different one of the plurality of output nodes after the delivery of at least a full sequential pair of the plurality of current pulses.

In one example, a method comprises: enabling a pulse pair circuit of an integrated circuit in response to determining that a receiver associated with the integrated circuit is active; identifying that at least one comparator of a DC-DC converter trips, the DC-DC converter having a plurality of comparators each to compare a regulated voltage output by the DC-DC converter to a corresponding reference voltage; and generating, in the pulse pair circuit, a control pulse pair according to the tripped output, and driving a driver circuit of the DC-DC converter using the control pulse pair.

DETAILED DESCRIPTION

In various embodiments, an integrated circuit including radio frequency (RF) circuitry further includes or is coupled to a DC-DC converter that provides multiple regulated voltages. To reduce interference caused by switching in this DC-DC converter, control techniques are provided. More specifically, embodiments may control generation and delivery of control pulses for operation of the DC-DC converter to create one or more notches or nulls in a frequency spectrum at a specified frequency or range of frequencies. More specifically, when an RF receiver is active, the DC-DC converter is controlled to output at least a pair of pulses that have a predetermined delay interval between their start times. Still further, arbitration circuitry may be configured to control direction of these pulses to ensure that multiple regulated voltages are maintained in tight regulation.

In various implementations, the DC-DC converter may be configured to provide multiple regulated output voltages. Each of these regulated output voltages may be provided to various circuitry. Depending upon configuration of a system, two or more such regulated output voltages may be output by the DC-DC converter to different circuits. These regulated voltages may be at different levels, including a first regulated voltage at a first level that is provided to power circuitry such as RF and other analog circuitry. A second regulated voltage may be output at a second, lower level and can be provided, e.g., to digital circuitry. Given the different levels, different current pulses may be used to provide these different regulated voltages. Of course, a DC-DC converter in accordance with an embodiment can output more than two different regulated voltages.

Implementations enable a pulse pair technique to be used to avoid interference at certain RF frequencies. Embodiments may further provide for control such that an appropriate pulse pair for a given regulated output voltage is generated and steered to the appropriate output path. In addition, given the variation in regulated voltages provided to these different output paths, certain internal pulse generation circuitry such as calibration circuitry can be dynamically disabled from use at certain regulated voltage levels (e.g., lower regulated voltage levels), to ensure proper operation.

Figure 1:
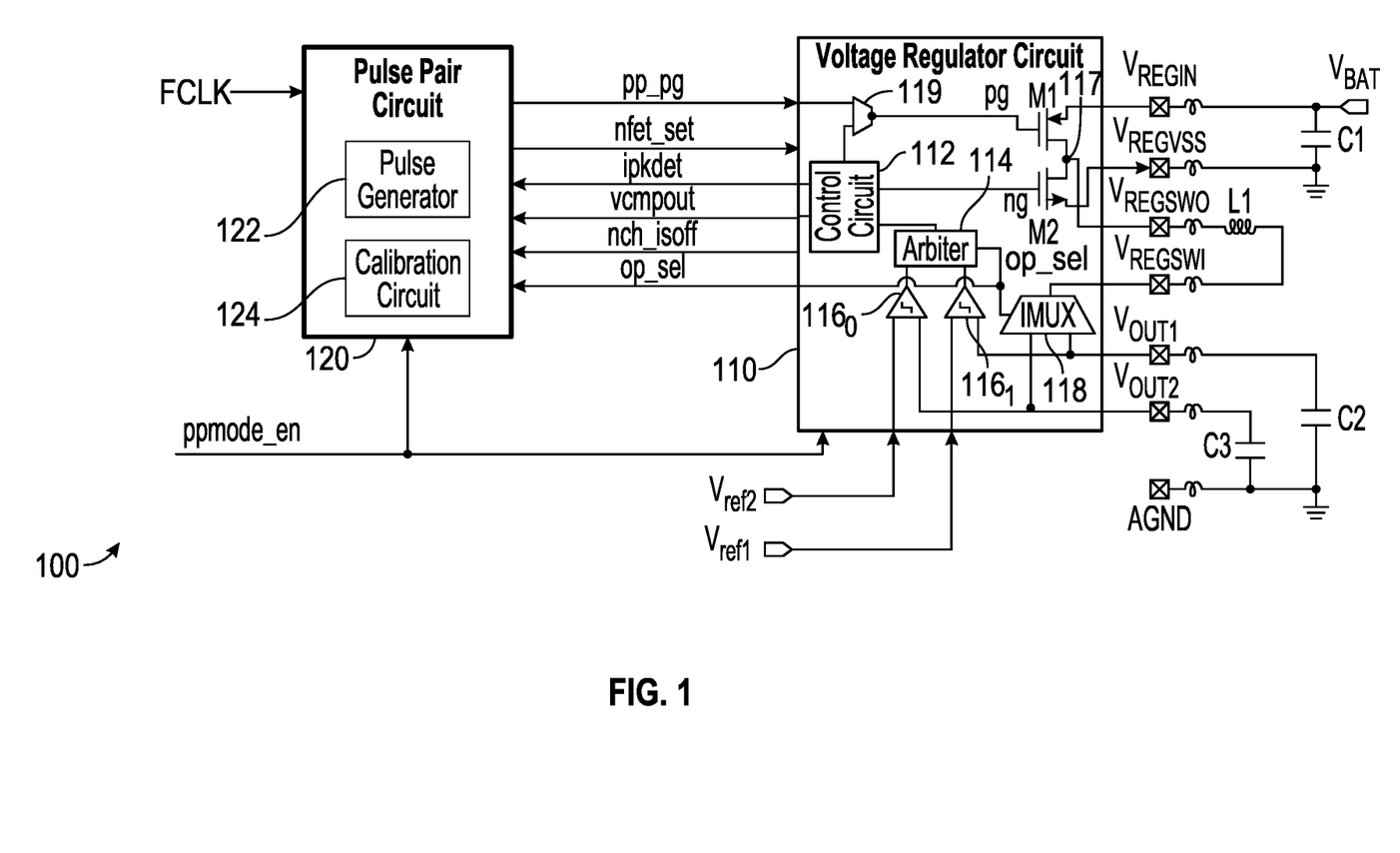
FIG. 1 is a block diagram of voltage regulator circuitry in accordance with an embodiment.

Referring now to FIG. 1, shown is a block diagram of voltage regulator circuitry in accordance with an embodiment. As shown in FIG. 1, circuitry 100 includes a voltage regulator circuit 110 and a pulse pair circuit 120. As shown in the high level of FIG. 1, voltage regulator circuit 110 receives an incoming voltage, namely a battery voltage ($V_{BAT}$) via a first input pin ($V_{REGIN}$). Based on control of switching in regulator circuit 110, a primary regulated voltage is generated and output via an output pin ($V_{REGSWO}$) and through an inductor L1 to generate a current pulse that in turn is provided to a selection circuit 118. In embodiments, selection circuit 118 may be implemented as a current multiplexer (IMUX). As shown, this current pulse in turn is received back-on-chip via another input pin ($V_{REGSWO}$). With this arrangement with a single inductor, voltage regulator circuit 110 may output multiple regulated voltages. Of course, voltage regulator circuit 110 may output more than two regulated voltages such as while in operation in a discontinuous conduction mode with pulse frequency modulation.

With embodiments herein, selection circuit 118, based upon appropriate control signals (as discussed further below), may steer the current pulse to one of two output paths via one of output pins $V_{OUT1}$ and $V_{OUT2}$ (also referred to herein as "load nodes"). As shown, these output pins couple to capacitors, respectively, capacitors C2 and C3. While not shown for ease of illustration, understand that circuitry to be powered by the regulated voltages may also couple to these output pins. As such, FIG. 1 illustrates an arrangement in which regulator circuit 110 is a DC-DC converter that provides two regulated voltage outputs, a first regulated voltage at a first voltage level ($V_{OUT1}$) and a second regulated voltage at a second voltage level ($V_{OUT2}$). Of course, voltage regulator circuit 110 may provide additional regulated voltages using embodiments. Note further this voltage regulator circuit 110 generates multiple regulated voltage using single pulse generation circuitry.

As further illustrated in FIG. 1, voltage regulator circuit 110 includes a tri-state driver formed of a first metal oxide semiconductor field effect transistor (MOSFET) M1 (namely a P-type MOSFET (PMOS)), and a second MOSFET M2 (namely a N-type MOSFET (NMOS)). As shown, PMOS M1 has a source terminal coupled to receive the battery voltage, a gate terminal coupled to a multiplexer 119, and a drain terminal coupled to an output node 117 that couples to the output pin $V_{REGSWO}$. In turn, NMOS M2 has a source terminal coupled to a reference voltage node (via pin $V_{REGVSS}$), a gate terminal coupled to a control circuit 112, and a drain terminal coupled to output node 117. Details regarding the switching nature of this tri-state driver may be found in one or more of U.S. Pat. Nos. 9,973,285 and 10,128,857, the disclosures of which are hereby incorporated by reference.

As shown, the gate terminals of MOSFETs M1, M2 receive control signals pg and ng. These control signals may be generated based at least in part on a measurement of the regulated voltage measured via comparators $116_{0,1}$. As shown, each comparator 116 receives, at a first input terminal, a regulated voltage output and, at a second input terminal, a reference voltage ($V_{ref1}$ and $V_{ref2}$, respectively). Based upon comparison of the regulated voltage to the reference voltage, each comparator 116 outputs a comparator signal, which it provides to an arbiter 114.

In embodiments, arbiter 114 may be configured to determine, based at least in part on the comparator outputs, which regulated voltage output is in need of a charging pulse. Arbiter 114 may be configured to identify when a comparator output trips, meaning that the comparator output indicates that the regulated voltage has fallen below its respective reference voltage level. In general in this situation, a switching voltage regulator may provide one or more charging pulses in order to increase the voltage back above the reference voltage level.

However, with two or more comparator outputs that may be provided to arbiter 114, it is possible for more than one comparator output to trip, indicating that the corresponding regulated voltage has dropped below its respective threshold. In such situations, arbiter 114 may be configured to select the regulated voltage output in a first-come, first-served basis. In other cases, arbiter 114 may be configured to select the regulated voltage output that is at most variance from its reference voltage level. In other cases, arbiter 114 may be configured to select a given regulator according to a relative priority, e.g., as stored in arbiter 114.

When arbiter 114 selects a given regulated voltage for which to provide a charging pulse, it sends a selection signal (op_sel) to selection circuit 118. In turn, selection circuit 118, based at least in part on the selection signal, directs a received current pulse to one of the output paths to act as a charging pulse for one of the regulated voltages.

In embodiments, arbiter 114 may operate in a freeze mode, such that when a given regulated voltage is selected to receive a current pulse, the control provided to selection circuit 118 remains fixed so that a pulse pair is directed. That is, regardless of the need of another regulated voltage for a current pulse, once a given regulated voltage is selected to receive a current pulse, it receives two sequential such current pulses of a pulse pair, thus effectively freezing arbiter 114 to not select another regulated voltage until after these two current pulses are generated and directed to the appropriate output path. After this time, arbiter 114 may unfreeze and enter into a normal operation mode.

As further shown, the output path select signal op_sel also is provided to pulse pair circuit 120. In general, pulse pair circuit 120 may be configured to generate a pair of control pulses that are provided to voltage regulator circuit 110 as pp_pg. In the high level shown in FIG. 1, pulse pair circuit 120 may be a digital circuit that includes a pulse generator 122 and a calibration circuit 124. Pulse generator circuit 122 may be configured by calibration circuit 124 to generate pulse pairs having an appropriate on duration (Tonmax) that may be determined based at least in part on the value of the comparator signal at the onset of the second paired pulse, namely an indication of the variance of the regulated voltage from its target.

As further shown, pulse pair circuit 120 further receives additional status information including a voltage comparison signal (vcmpout) and a current detection signal (ipkdet) and nch_isoff, based at least in part on which control pulse pairs are generated. Pulse pair circuit 120 generates the pg signal to control PMOS M1, then the inductor currents starts to increase. When the inductor current reaches the programmed peak value (ipk), ipkdet is asserted, then pulse pair circuit 120 deasserts pp_pg, and asserts nfet_set. In turn, control circuit 112 in regulator 110 asserts ng to turn on NMOS M2, and the inductor current starts to decrease until it reaches zero. This event is detected by a zero current detector. NMOS M2 is then turned off, and nch_isoff is asserted to indicated that a complete pulse is delivered.

As further illustrated, pulse pair circuit 120 further receives a clock signal folk. As will be described further herein, this clock signal, which may be at different frequencies based on operating parameters, may be used to clock various digital circuitry within pulse pair circuit 120.

Pulse pair circuit 120 also includes a calibration circuit 124, which may be configured to calibrate the pulse width of the control pulses. In certain implementations, calibration circuit 124 may be disabled for secondary output voltages. For example, for the secondary lower regulated voltage provided as $V_{OUT2}$, calibration circuit 124 may be disabled. In other cases, multiple instances of calibration circuit 124 may be used to calibrate on durations (Tonmax$_1$, Tonmax$_2$, . . . etc.) for corresponding output voltages VOUT$_1$, VOUT$_2$, . . . , etc.

At a high level, calibration circuit 124 may be configured to control pulse width of control pulses to minimize the output voltage ripples when the pulse pairing property is activated. For example, this circuitry may limit the on pulse time to a maximum level for buck converters, and/or limit the off pulse time for boost converters. To this end, calibration circuit 124 may control pulse width of control pulses based at least in part on loading and supply voltage (e.g., battery) conditions. When a light load is present, the control pulses may have their on-time duration decreased, and correspondingly, when a high load is present the control pulses may have their on-time duration increased.

Still with reference to voltage regulator circuit 110, a control circuit 112 may provide control pulses to a multiplexer 119, which further receives the control pulses from pulse pair circuit 120. When, e.g., a receiver is active, multiplexer 119 may be configured to pass the pulse pairs generated in pulse pair circuit 120. Instead when the receiver is inactive, control circuit 112 may provide control pulses via multiplexer 119. Such operation may be controlled by a pulse pair mode enable signal, which is provided to both pulse pair circuit 120 and voltage regulator circuit 110. Understand while shown at this high level in the embodiment of FIG. 1, many variations and alternatives are possible.

Figure 2:
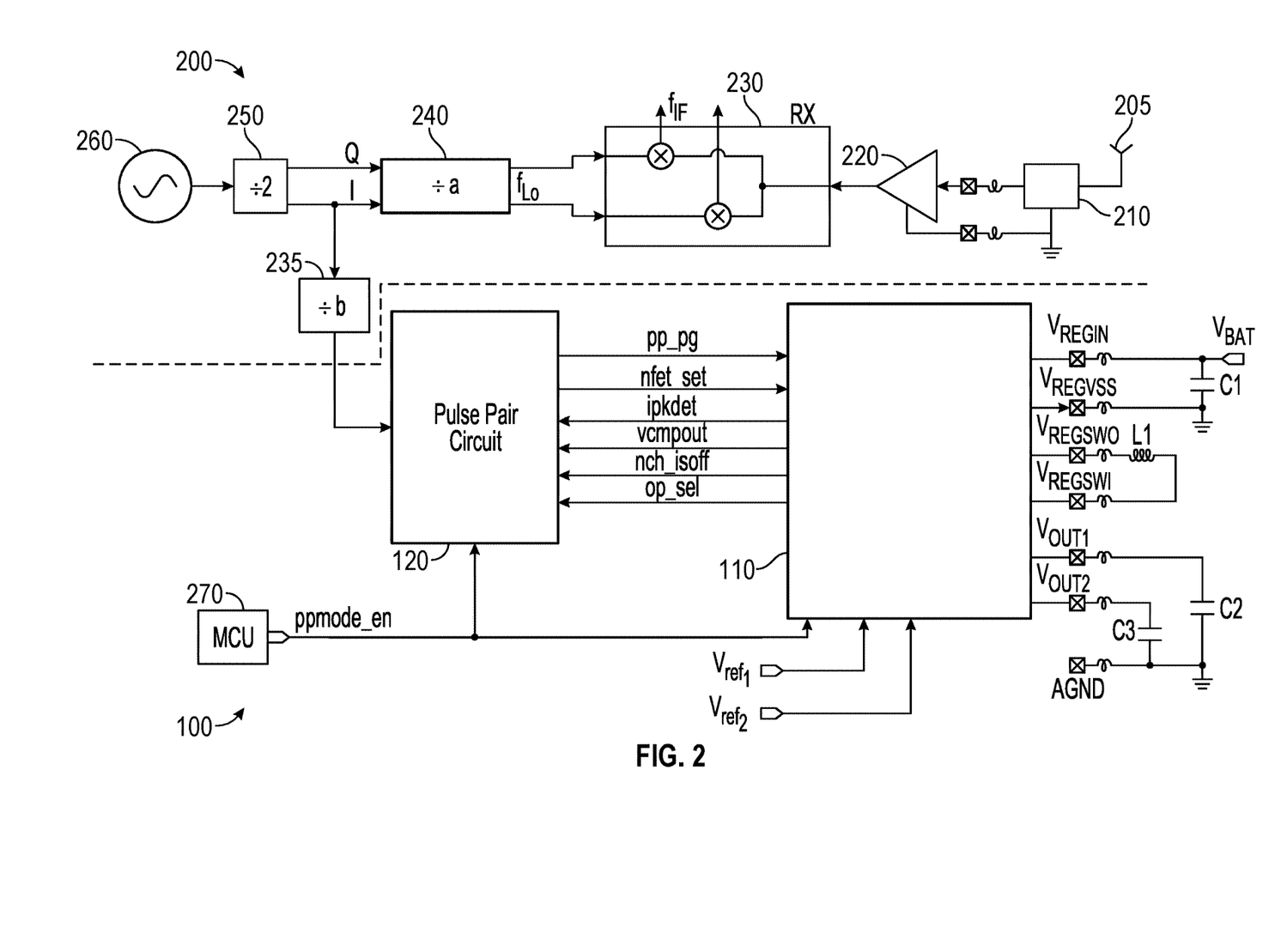
FIG. 2 is a block diagram of a system in accordance with an embodiment.

Referring now to FIG. 2, shown is a block diagram of a system in accordance with an embodiment. As shown in FIG. 2, system 200 may be any type of communication device having at least receiver capability. Oftentimes, a receiver and transmitter are combined as a transceiver. In the high level view shown in FIG. 2, system 200 is shown with a receiver only; of course embodiments may be implemented in systems having transmit capabilities as well.

As shown, incoming RF signals are received via an antenna 205 and are provided in turn to a matching network 210, which may be an off-chip device. A resulting impendence-matched RF signal is coupled on-chip via an input pin and is provided to a low noise amplifier (LNA) 220. The resulting signal after amplification is downconverted to a lower frequency, e.g., an intermediate frequency (IF), within a receiver 230 including a complex mixer. The resulting IF signal may be provided for further processing (not shown in FIG. 2).

As further illustrated in FIG. 2, clock generation circuitry, e.g., of a local oscillator (LO), is used to provide a mixing signal to the complex mixer, namely a complex mixing signal fro. As shown, a master oscillator 260, which may be a phase locked loop or any other type of clock generator, generates a master clock signal. Although embodiments are not limited in this regard, this clock signal may be generated at, e.g., a nominal frequency of 5.2 gigahertz (GHz); of course different values may be present in other implementations. This clock signal is provided to a frequency divider 250 which may be a divide by two frequency divider that generates complex clock signals. As shown, these complex signals (I and Q) are provided to another frequency divider, namely a programmable frequency divider 240. In different embodiments, depending upon the desired frequency of operation and other operating characteristics, clock divider 240 may have a controllable divider ratio between 1 and 16. The resulting divided clock signals may be provided as the mixing signals to the complex mixer of receiver 230.

As further shown, the in-phase (I) clock signal output by clock divider 250 also is provided to another clock divider 235 which may generate a digital clock frequency, e.g., which may be provided to various digital circuitry of system 200, including a pulse pair circuit 120 as discussed above. Although embodiments are not limited in this regard, as examples, divider 235 may have a divide ratio of 13 to generate a digital clock of approximately 200 megahertz (MHz), and a divide ratio of 11 for a 236.36 MHz clock. Note that the digital clock is used to time the delay between the paired pulses, and it has a prescribed relationship to LO frequency, i.e., $$Td = N_d * \frac{a}{bf_{LO}}.$$

This way, me notches in the frequency spectrum fall at or near the LO frequency and/or its harmonics, as described in U.S. Pat. No. 10,128,857, incorporated by reference above.

As further illustrated in FIG. 2, a microcontroller (MCU) 270 may control overall operation within system 200. When the receiver is active, MCU 270 may provide an active pulse pair mode enable signal to pulse pair circuit 120 and voltage regulator circuit 110 such that these devices may operate in a pulse pair mode, to reduce noise at RF. While shown at this high level in the embodiment of FIG. 2, understand that additional components may be present in a given system.

Figure 3:
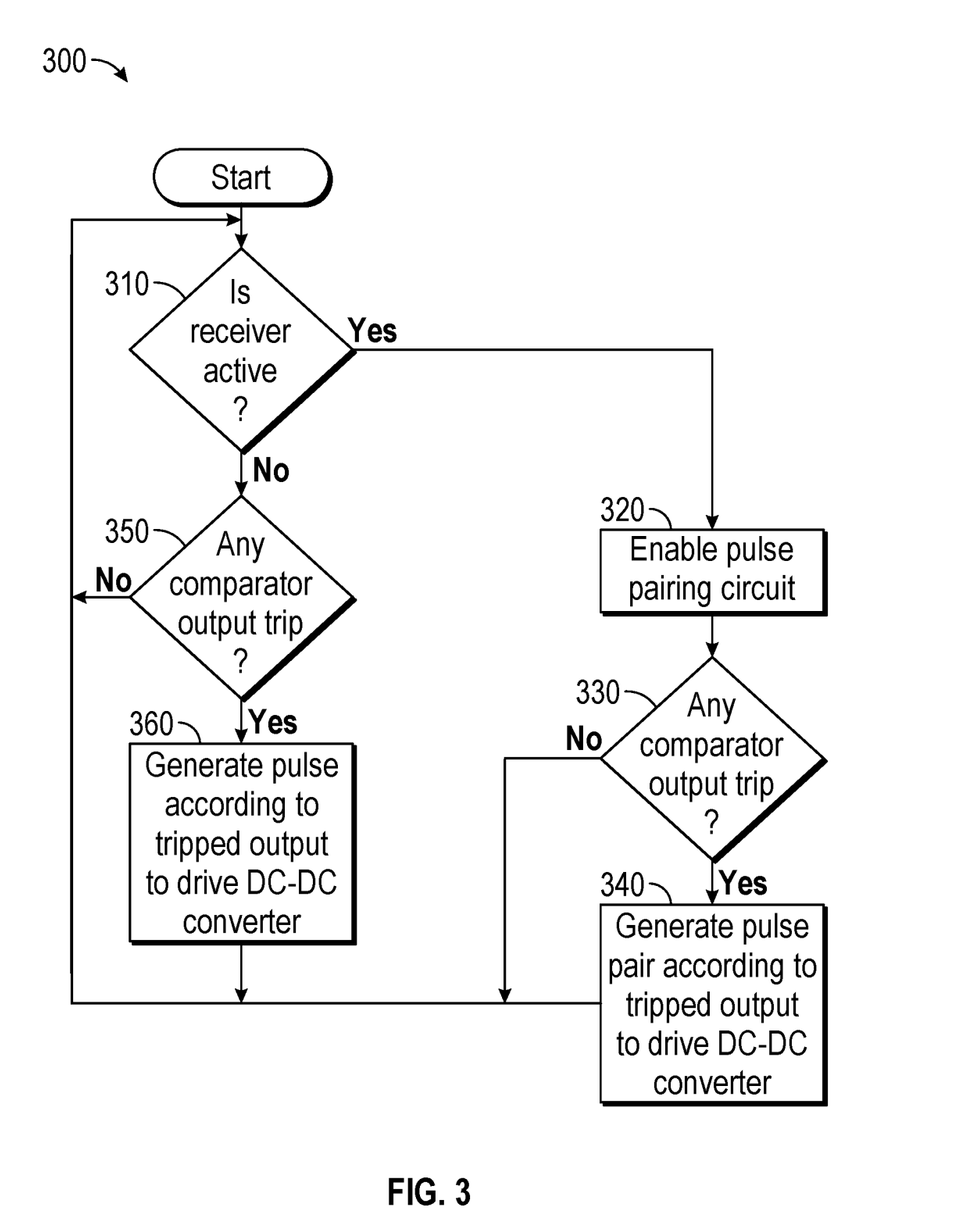
FIG. 3 is a flow diagram of a method in accordance with an embodiment.

Referring now to FIG. 3, shown is a flow diagram of a method in accordance with an embodiment. As shown in FIG. 3, method 300 is a high level view of dynamically enabling pulse pairing circuitry when a receiver associated with a DC-DC converter is active. In embodiments, method 300 may be performed by hardware circuitry, such as a microcontroller of a radio including the receiver and the voltage converter. In some embodiments, the microcontroller may include or be coupled to a non-volatile storage medium that stores instructions that when executed perform at least portions of the method.

As illustrated, method 300 begins by determining whether the receiver is active (diamond 310). This determination of receiver activity may be in response to selection of a radio mode in which the receiver is enabled. If the receiver is active, control passes to block 320 where a pulse pairing circuit may be enabled. To this end, the controller may send a pulse pair enable signal to both a digital pulse pair circuit and the voltage regulator itself. As this point, the receiver may begin normal operation while using at least some power provided by the voltage regulator.

During such normal operation it may be determined whether any comparator output trips (diamond 330). As described above, one or more comparators included in a voltage regulator may trip when a feedback regulated voltage output from the voltage regulator falls below a corresponding threshold level. If so, control passes to block 340 where a pulse pair may be generated according to the tripped output. This pulse pair may be used to drive the DC-DC converter. To this end, the pulse pair circuit may send a pair of control pulses with appropriate on-time to enable drive circuitry of the DC-DC converter to generate current pulses that are provided to the appropriate output node of the voltage regulator to thus increase the regulated voltage back to the regulated voltage level.

Still with reference to FIG. 3, after generating the pulse pair or in response to a determination that no comparator has tripped, control passes back to diamond 310 to determine whether the receiver remains active. If not, control passes to diamond 350, where it may be determined whether any comparator output trips. Understand further that in the situation where the receiver moves from an active state to an inactive state, the pulse pair circuit itself also may be disabled by de-asserting the pulse pair enable signal. In this way, the power consumed in this pulse pair circuit may be saved.

At diamond 350, if it is determined that a comparator output trips, control passes to block 360 where a pulse may be generated according to the tripped output to drive the DC-DC converter. Note that in this instance, only a single pulse is generated and used to provide a current pulse to the appropriate output node. Of course, should the regulated output voltage at this output node remain below the threshold level, the comparator output still trips, and a continued stream of pulses may be steered to this output node. However, another comparator output that trips may cause one or more pulses to be generated and steered to a different output node for another regulated voltage level. Understand that at block 360, the generated pulse is generated one at a time and does not constitute a pulse pair as is done in an active pulse pair mode. While shown at this high level in the embodiment of FIG. 3, many variations and alternatives are possible.

Figure 4:
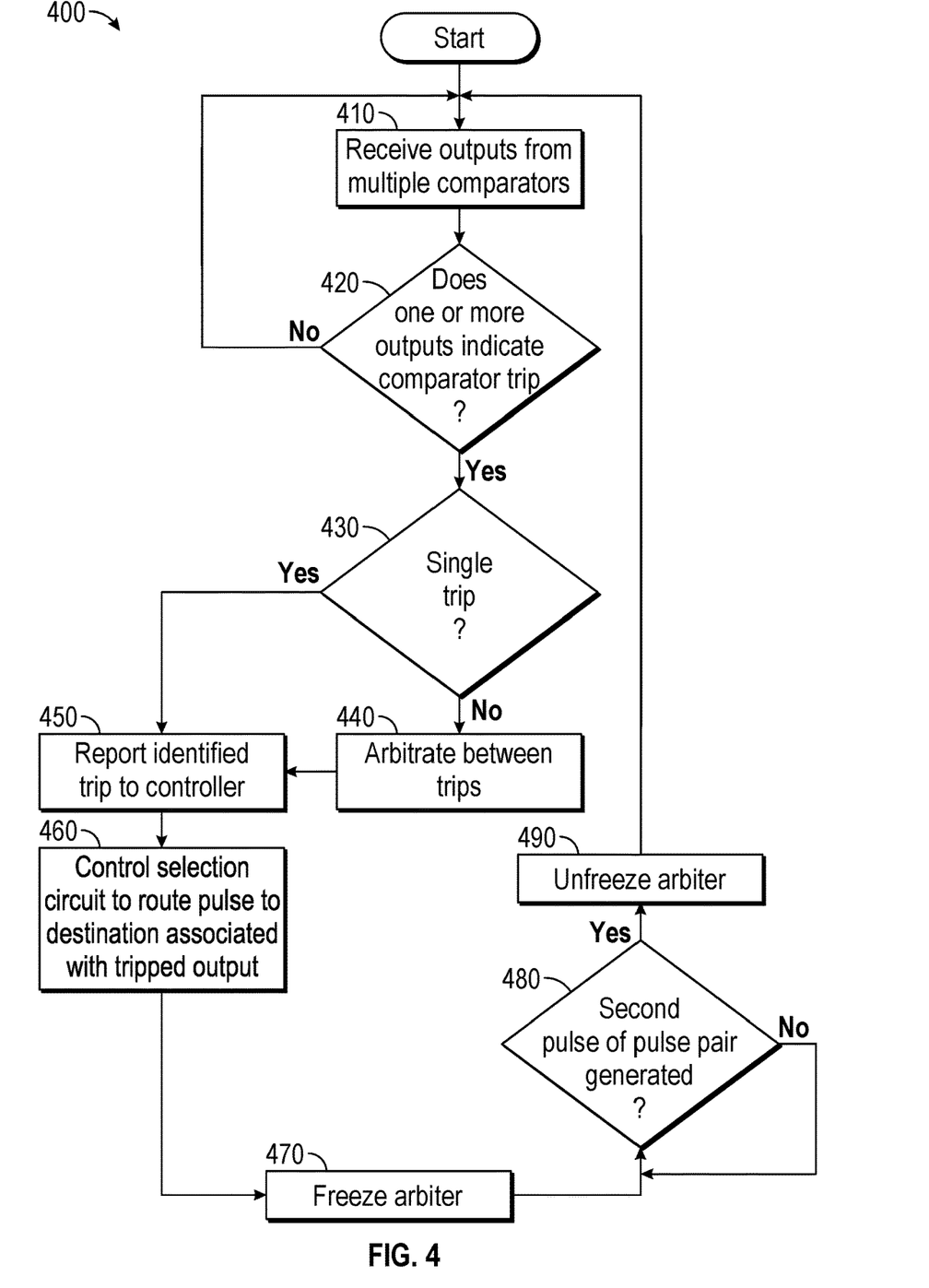
FIG. 4 is a flow diagram of a method in accordance with another embodiment.

Referring now to FIG. 4, shown is a flow diagram of a method in accordance with another embodiment. As shown in FIG. 4, method 400 is a high level view of operation of pulse pair and arbiter circuitry of a DC-DC converter in a pulse pair mode in accordance with an embodiment. In embodiments, method 400 may be performed by hardware circuitry, such as an arbiter, a pulse pair circuit, and additional control circuitry of a voltage converter, which may execute instructions stored in a non-transitory storage medium.

As illustrated, method 400 begins by receiving outputs from multiple comparators within the arbiter (block 410). Next it is determined at diamond 420 whether one or more of the outputs indicate that the comparator has tripped, indicating that a given regulated voltage has fallen below its threshold level. If so, control next passes to diamond 430 to determine whether only a single comparator trips. If not, at block 440 an arbitration may be performed between the tripped outputs. In one example, the arbiter may select the output that is at a greatest variance (e.g., a total variance or as a percentage of variance with respect to its threshold). Control next passes to block 450, where the arbiter may report the selected trip to a control circuit of the voltage regulator. Control also passes here in the case of a single comparator trip (from diamond 430).

In response to this identification, the controller may control a selection circuit (e.g., a multiplexer) to route or steer a pulse to the destination associated with the tripped output (block 460). This destination may be a given output node of the voltage regulator that provides the regulated voltage.

Control next passes to block 470 where the arbiter may be placed into a freeze mode. That is, with pulse pairing mode active, the arbiter may be frozen from selecting another comparator output until two pulses of a pulse pair associated with the given voltage regulator output have been generated. Accordingly, control next passes to diamond 480 to determine whether the second pulse of the pulse pair has been generated. When this pulse pair is generated and provided as a current pulse to the appropriate output node, control passes to block 490 where the arbiter may be unfrozen. When the arbiter exits the freeze mode back to a normal mode, it may again identify another comparator output as being tripped and the intended target for at least one pulse pair. Understand that while shown at this high level in the embodiment of FIG. 4, many variations and alternatives are possible.

Figure 5:
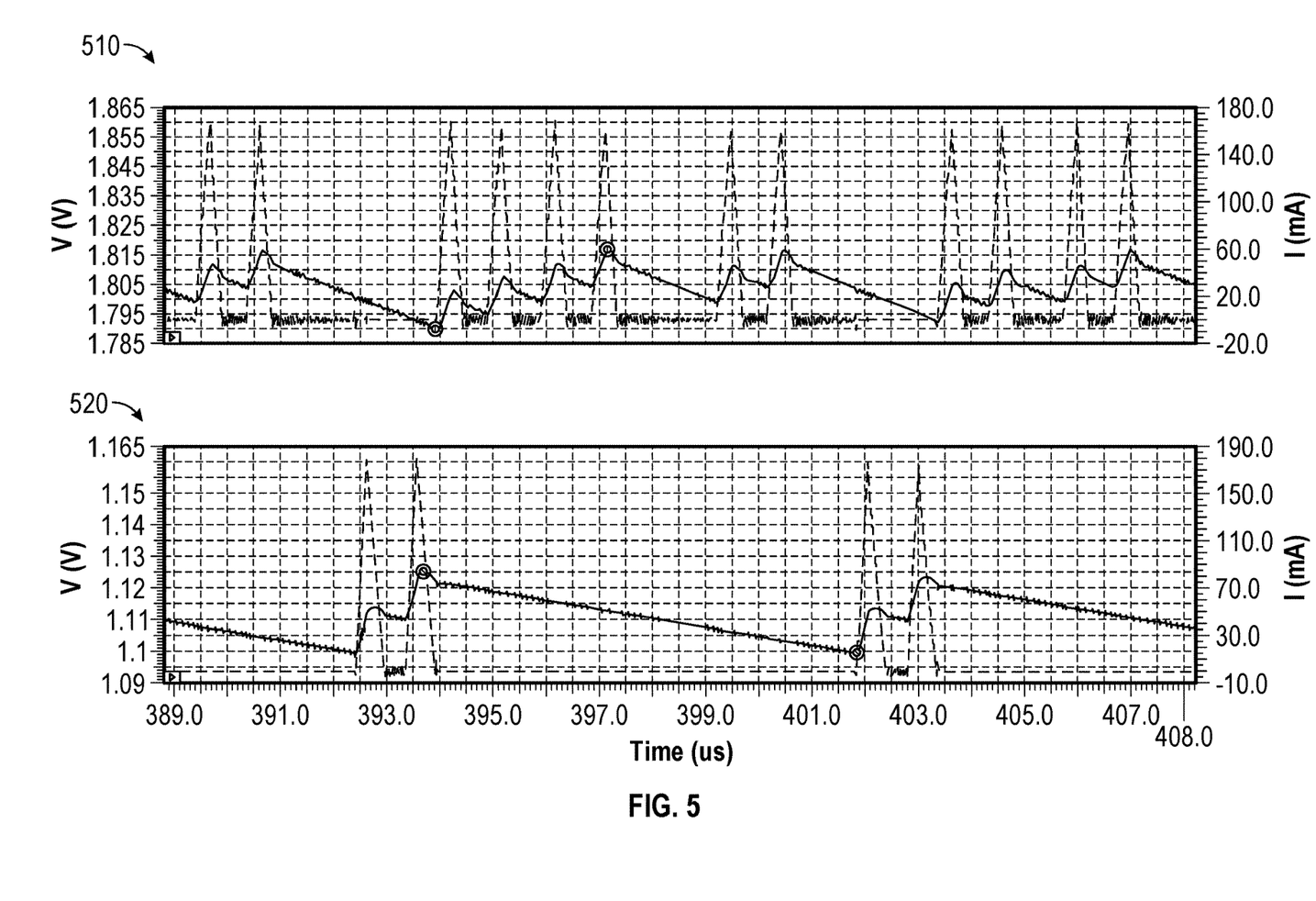
FIG. 5 is a graphical illustration of operation of a DC-DC converter in accordance with an embodiment.

Referring now to FIG. 5, shown is a graphical illustration of regulated output voltages over time in the presence of pulse pairing. As shown in FIG. 5, in a top curve 510 of a regulated voltage at a load node of a first output path over time, as the regulated voltage falls below a threshold level (e.g., 1.8 volts), multiple (i.e., two) current pulses are generated, causing the regulated voltage to increase.

Curve 520 illustrates a similar situation for another regulated voltage, e.g., at a lower regulated voltage level of 1.1 volts. Again, pulse pairs are generated when the regulated voltage falls below a given threshold voltage.

Thus when referring to these two curves together, note that a pulse pair is only provided to one or the other output path at a time, regardless of whether a regulated voltage of the other output path falls below its threshold level. Note further in FIG. 5 that curves 510 and 520 illustrate an example in which battery voltage may be relatively higher than the regulated voltages (e.g., at a level of 3.6 volts).

Figure 6:
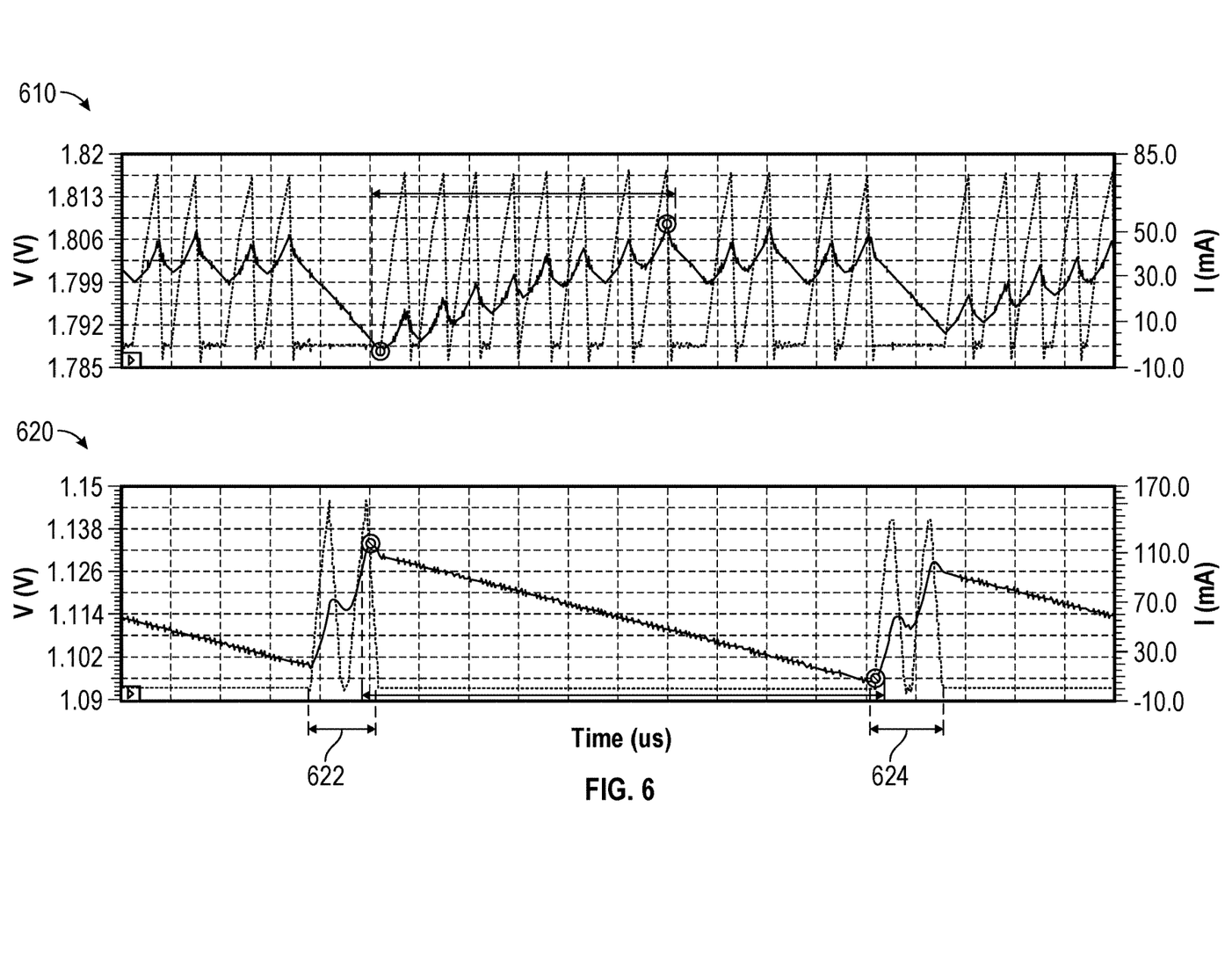
FIG. 6 is a graphical illustration of operation of a DC-DC converter in accordance with another embodiment.

Referring now to FIG. 6, shown is another graphical illustration of regulated output voltages over time in the presence of pulse pairing. As shown in FIG. 6, curves 610 and 620 generally correspond to the curves in FIG. 5. However in this implementation, a battery voltage is closer to the larger regulated voltage (e.g., a battery voltage of 2.2 volts and regulated voltage of 1.8 volts).

In this situation, after providing current for the lower regulated voltage as shown in curve 620, the larger regulated voltage dips, as shown in curve 610. That is, after the second regulated voltage takes a pulse pair, the calibration circuit may cause more charge to be pumped into the other regulated voltage by way of current pulse pairs to fast recover from the dip caused by supplying the second regulated voltage. Also note that when pulse pairs are provided to the second regulated voltage path at time instants 622 and 624, the calibration loop may be halted. Understand while these specific examples are shown in FIGS. 5 and 6, many other possibilities exist.

Figure 7:
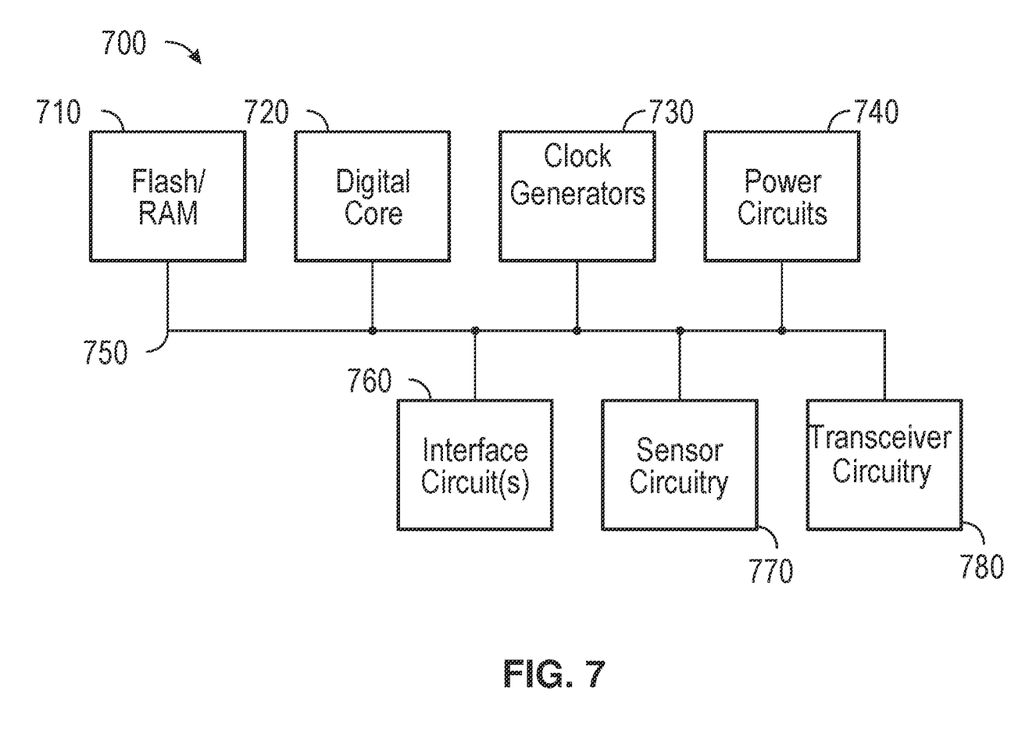
FIG. 7 is a block diagram of a representative integrated circuit in accordance with an embodiment.

Embodiments can be implemented in many different environments. Referring now to FIG. 7, shown is a block diagram of a representative integrated circuit 700 that can implement a pulse pairing technique as described herein. In the embodiment shown in FIG. 7, integrated circuit 700 may be, e.g., a microcontroller, wireless transceiver that may operate according to one or more wireless protocols (e.g., WLAN-OFDM, WLAN-DSSS, Bluetooth, among others), or other device that can be used in a variety of use cases, including sensing, metering, monitoring, embedded applications, communications, applications and so forth, and which may be particularly adapted for use in an IoT device.

In the embodiment shown, integrated circuit 700 includes a memory system 710 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for performing arbitration of pulse pairing in accordance with an embodiment.

Memory system 710 couples via a bus 750 to a digital core 720, which may include one or more cores and/or microcontrollers that act as a main processing unit of the integrated circuit. In turn, digital core 720 may couple to clock generators 730 which may provide one or more phase locked loops or other clock generator circuitry to generate various clocks for use by circuitry of the IC.

As further illustrated, IC 700 further includes power circuitry 740, which may include one or more voltage regulators. In addition, power circuitry 740 may include pulse pairing circuitry and arbitration circuitry to control pulse pair selection to the various voltage regulators, as described herein. Additional circuitry may optionally be present depending on particular implementation to provide various functionality and interaction with external devices. Such circuitry may include interface circuitry 760 which may provide interface with various off-chip devices, sensor circuitry 770 which may include various on-chip sensors including digital and analog sensors to sense desired signals, such as for a metering application or so forth.

In addition as shown in FIG. 7, transceiver circuitry 780 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. Understand while shown with this high level view, many variations and alternatives are possible.

Note that ICs such as described herein may be implemented in a variety of different devices such as an IoT device. This IoT device may be, as two examples, a smart bulb of a home or industrial automation network or a smart utility meter for use in a smart utility network, e.g., a mesh network in which communication is according to an IEEE 802.15.4 specification or other such wireless protocol.

Figure 8:
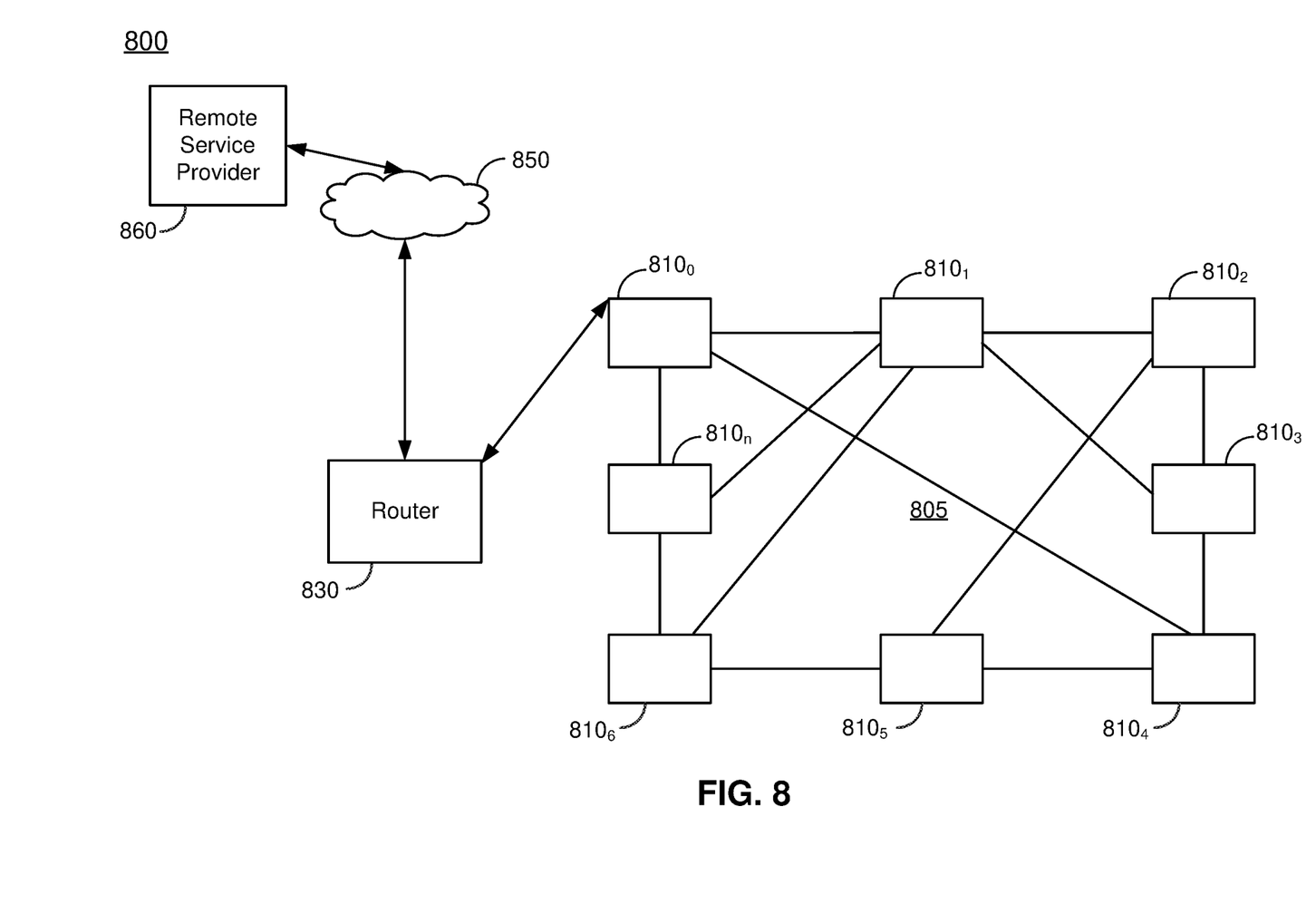
FIG. 8 is a block diagram of a system in accordance with an embodiment.

Referring now to FIG. 8, shown is a high level diagram of a network in accordance with an embodiment. As shown in FIG. 8, a network 800 includes a variety of devices, including smart devices such as IoT devices, routers and remote service providers. In the embodiment of FIG. 8, a mesh network 805 may be present, e.g., in a building having multiple IoT devices $810_{0-n}$. Such IoT devices may include one or more multiple output DC-DC converters and pulse pair and arbitration circuitry as described herein. As shown, at least one IoT device 810 couples to a router 830 that in turn communicates with a remote service provider 860 via a wide area network 850, e.g., the internet. In an embodiment, remote service provider 860 may be a backend server of a utility that handles communication with IoT devices 810. Understand while shown at this high level in the embodiment of FIG. 8, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a driver circuit having a first control input, a second control input and an output node coupled between a supply voltage node and a reference voltage node, the driver circuit to receive control pulses and output a plurality of current pulses in response to the control pulses, the driver circuit to provide a plurality of regulated voltages according to the control pulses;
a selection circuit coupled to the output node, wherein the selection circuit is to be controlled to output one or more of the plurality of current pulses to a selected one of a plurality of load nodes, each of the plurality of load nodes to provide at least one of the plurality of regulated voltages; and
an arbiter coupled to the selection circuit, wherein in a pulse pair mode, the arbiter is to control the selection circuit to direct a sequential pair of the plurality of current pulses to one of the plurality of load nodes.

2. The apparatus of claim 1, wherein the arbiter is to control the selection circuit based on a comparison of a regulated voltage at the selected load node to a reference voltage.

3. The apparatus of claim 2, further comprising a plurality of comparators, each of the plurality of comparators to compare a regulated voltage at one of the plurality of load nodes to one of a plurality of reference voltages.

4. The apparatus of claim 3, wherein the arbiter is to select the one of the plurality of load nodes to receive the sequential pair of the plurality of current pulses when the regulated voltage at the selected load node is less than the reference voltage.

5. The apparatus of claim 3, wherein after the selection circuit directs the sequential pair of the plurality of current pulses, the arbiter is to control the selection circuit to direct another sequential pair of the plurality of current pulses to a different one of the plurality of load nodes.

6. The apparatus of claim 1, further comprising a microcontroller to enable the pulse pair mode when a receiver is active and disable the pulse pair mode when the receiver is inactive.

7. The apparatus of claim 1, wherein the selection circuit is to send a first sequential pulse pair to a first load node of the plurality of load nodes and thereafter send a plurality of sequential pulse pairs to a second load node of the plurality of load nodes.

8. The apparatus of claim 1, further comprising a calibration circuit to control an on-time duration of the control pulses, wherein when a secondary regulated voltage is selected, the calibration circuit is to be disabled.

9. The apparatus of claim 1, wherein the arbiter is to operate in a freeze mode to control the selection circuit to direct the sequential pair of the plurality of current pulses to the one of the plurality of load nodes.

10. The apparatus of claim 9, wherein the arbiter is to maintain a count of the sequential pair of the plurality of current pulses, and after the selection circuit directs a second one of the sequential pair of the plurality of current pulses to the one of the plurality of load nodes, the arbiter is to exit the freeze mode.

11. A method comprising:
enabling a pulse pair circuit of an integrated circuit in response to determining that a receiver associated with the integrated circuit is active;
identifying that at least one comparator of a DC-DC converter trips, the DC-DC converter having a plurality of comparators each to compare a regulated voltage output by the DC-DC converter to a corresponding reference voltage; and
generating, in the pulse pair circuit, a control pulse pair according to the tripped output, and driving a driver circuit of the DC-DC converter using the control pulse pair.

12. The method of claim 11, further comprising directing a pair of current pulses output by the driver circuit in response to the control pulse pair to a first load node of a plurality of load nodes, the first load node coupled to the tripped comparator, the first load node to provide a first regulated voltage.

13. The method of claim 12, further comprising, after directing the pair of current pulses to the first load node, directing another pair of current pulses to another load node, the another load node coupled to another tripped comparator, the another load node to provide another regulated voltage.

14. The method of claim 12, further comprising enabling a calibration circuit to control an on time duration for the control pulse pair.

15. The method of claim 14, further comprising when a secondary regulated voltage is below a threshold level, disabling the calibration circuit.

16. The method of claim 12, further comprising directing the pair of current pulses to the first load node when the first regulated voltage is at a variance with respect to a reference level.

17. The method of claim 12, further comprising disabling the pulse pair circuit in response to receiver inactivity, and thereafter directing single current pulses to a selected one or more of the plurality of load nodes.

18. The apparatus of claim 1, further comprising:
a radio frequency (RF) receiver to receive a RF signal and process the RF signal into a lower frequency signal; and
a DC-DC converter to receive a supply voltage at the supply voltage node and generate the plurality of regulated voltages.

19. The apparatus of claim 18, wherein the DC-DC converter comprises:
the driver circuit;
the selection circuit; and
the arbiter.

20. The apparatus of claim 18, further comprising at least one digital circuit coupled to the RF receiver to process the lower frequency signal, the DC-DC converter to provide a first regulated voltage to the RF receiver and provide a second regulated voltage to the at least one digital circuit.

* * * * *